(12) United States Patent
Amanullah et al.

(10) Patent No.: US 11,279,862 B2
(45) Date of Patent: Mar. 22, 2022

(54) FIBROUS LOST CIRCULATION MATERIAL (LCM)

(71) Applicant: Saudi Arabian Oil Company, Dhahran (SA)

(72) Inventors: Md Amanullah, Dhahran (SA); Timothy E. Moellendick, Dhahran Heights (SA); Raed Alouhali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/109,738

(22) Filed: Dec. 2, 2020

(65) Prior Publication Data
US 2021/0087452 A1    Mar. 25, 2021

Related U.S. Application Data

(62) Division of application No. 16/267,659, filed on Feb. 5, 2019, now Pat. No. 10,883,032.

(51) Int. Cl.
*C09K 8/03* (2006.01)

(52) U.S. Cl.
CPC .......... *C09K 8/03* (2013.01); *C09K 2208/08* (2013.01)

(58) Field of Classification Search
None
See application file for complete search history.

(56) References Cited

U.S. PATENT DOCUMENTS

| 2,599,745 | A | | 6/1952 | Campbell et al. |
| 2,756,209 | A | * | 7/1956 | Morgan ............... E21B 21/003 507/104 |
| 2,811,488 | A | | 10/1957 | Nestle |
| 3,228,469 | A | * | 1/1966 | Kern ..................... C09K 8/516 166/292 |
| 3,411,581 | A | | 11/1968 | Alpha |
| 4,439,328 | A | * | 3/1984 | Moity .................... C09K 8/035 507/103 |
| 4,498,995 | A | | 2/1985 | Gockel |

(Continued)

FOREIGN PATENT DOCUMENTS

| CN | 103694976 | 4/2014 |
| WO | 2011076344 A1 | 6/2011 |

OTHER PUBLICATIONS

An Experimental Study on Particle Sizing of Natural Substitutes for Drilling Fluid Applications, Mohammed Wajheeuddin and Enamul Hossain, Journal of Nature and Science Sustainable Technology, vol. 8, No. 2, pp. 1-14, Apr. 2014. (Year: 2014).*

(Continued)

*Primary Examiner* — John J Figueroa
(74) *Attorney, Agent, or Firm* — Bracewell LLP; Constance G. Rhebergen; Brian H. Tompkins

(57) ABSTRACT

A human hair lost circulation material (LCM) is provided. The human hair LCM includes human hairs obtained from sources of human hair waste such as barber shops, saloons, beauty parlors, and religious sites. The human hair LCM may include human hair having a diameter in the range of about 50 microns to about 150 microns and human hair having a length in the range of 2 millimeters (mm) to about 4 centimeters (cm). Methods of lost circulation control using and formation of a human hair LCM are also provided.

7 Claims, 1 Drawing Sheet

(56) References Cited

U.S. PATENT DOCUMENTS

| | | | |
|---|---|---|---|
| 4,526,240 | A | 7/1985 | Mckinley et al. |
| 7,271,131 | B2 | 9/2007 | Halliday et al. |
| 7,297,662 | B2 | 11/2007 | Verret |
| 7,507,692 | B2 | 3/2009 | Kiang |
| 7,838,469 | B2 | 11/2010 | Cunningham et al. |
| 7,977,280 | B2 | 7/2011 | Jarrett |
| 9,285,355 | B2 | 3/2016 | Murphy et al. |
| 2003/0158045 | A1 | 8/2003 | Jarrett |
| 2012/0322695 | A1 | 12/2012 | Kefi et al. |
| 2013/0244910 | A1 | 9/2013 | Livanec et al. |
| 2016/0060501 | A1 | 3/2016 | Kefi et al. |
| 2017/0114271 | A1* | 4/2017 | Hudgens ............ B01D 17/0214 |
| 2017/0166797 | A1 | 6/2017 | Reddy |
| 2017/0174980 | A1 | 6/2017 | Ladva et al. |

OTHER PUBLICATIONS

Hemp Inc. "Drillwall(TM)—Lost Circulation Material (LCM)" available as of Jan. 24, 2018 at: http://hempinc.com/products/drillwall-lost-circulation-material-lcm/; pp. 1-2.

International Search Report and Written Opinion for International Application No. PCT/US2020/016813 (SA5845) dated May 14, 2020; pp. 1-15.

Kefi et al., "Optimizing in Four Steps Composite Lost-Circulation Pills Without Knowing Loss Zone Width", IADC/SPE, 2010, p. 14.

Schlumberger "Wellbore Strengthening and Lost Circulation" available as of Jan. 24, 2018 at: http://www.slb.com/services/drilling/drilling_fluid/drilling_fluid_solutions/wellbore_strengthening_lost_circulation; pp. 1-2.

The Beauty Brains "Top 10 strange uses for human hair" available as of Jan. 24, 2018 at: http://thebeautybrains.com/2007/12/top-10-strange-uses-for-human-hair/; pp. 1-10.

* cited by examiner

FIBROUS LOST CIRCULATION MATERIAL (LCM)

CROSS-REFERENCE TO RELATED APPLICATIONS

This application is a divisional of and claims priority from U.S. Non-provisional application Ser. No. 16/267,659 filed Feb. 5, 2019, and titled "FIBROUS LOST CIRCULATION MATERIAL (LCM)," a copy of which is incorporated by reference in its entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

Lost circulation materials (LCMs), also referred to as loss control materials, are used to mitigate the lost circulation by blocking the path of the drilling fluid (such as drilling mud) into the formation. Different types of LCMs are used to control loss of circulation. Depending on the morphological characteristics of existing LCMs, they can be classified as fibrous, flaky, granular or their blends. Fibrous materials may be produced from biological sources or non-biological sources (that is, made synthetically). Non-biological fibrous materials include synthetic fibers made from minerals, inorganic polymers and other inorganic materials. Fibrous materials produced from biological sources may be derived from plant and plant wastes or animal fibrous wastes.

Plant-based fibers may be weak, easily damageable and prone to quick biodegradation. Plant-based fibers may also have poor thermal, mechanical, chemical and biological stability compared to other LCMs. Due to high temperatures, complex chemical environments, severe mechanical degradation, and potential bacterial attack and degradation, plant-based fibers may be easily degraded in downhole conditions. Other available biological fibers may also suffer from insufficient mechanical strength, chemical resistance, thermal stability, and biological degradation. Consequently, existing LCMs formed may perform poorly at downhole conditions and may not seal and block lost circulation zones for sufficient time periods.

Human hair waste generated by the cosmetic and other industries are considered as useless waste material and are typically disposed of in the surrounding environments or in landfills. Due to wind and rain, water washing and other cleaning, the human hair waste may enter municipal waste streams, drainage systems, and sewer systems where they cause blockage of drainage, sewer, and water lines. Such blockages can cause environmental and social problems, especially in areas with inefficient or poor waste management. The blockage of drainage, sewer, and water lines may also cause overflow of sewage and water into streets, sidewalks, yards, and the other areas.

Other disposal approaches for human hair waste may be problematic. For example, disposal by the burning of human hair waste may not be environmentally friendly due to the release of certain gases such as ammonia, carbonyl, sulfite, hydrogen sulfide, sulfur dioxide, and phenols, as well as ash into the atmosphere. The products released from burning may be undesirable and create greater problems than the human hair waste itself.

Embodiments of the disclosure include a human hair LCM used to mitigate or prevent lost circulation as well as provide seepage control and minimize or prevent fluid loss. The human hairs of the human hair LCM may entangle, interweave, network, curl, and otherwise interact under pressure to form a plug or seal at openings of fractures, gaps, fissures, and cracks, in a lost circulation zone and prevent loss of drilling fluid. Advantageously, the production of the human hair LCM may be relatively low cost (for example, lower capital investment and labor costs) and may be less energy intensive as compared to the production of other LCMs (for example, synthetic fiber LCMs).

A method to control lost circulation in a lost circulation zone is provided. The method includes introducing an altered drilling fluid into the wellbore such that the altered drilling fluid contacts the lost circulation zone and reduces a rate of lost circulation into the lost circulation zone, such that the altered drilling fluid includes a drilling fluid and a lost circulation material (LCM), the LCM including a plurality of human hairs. In some embodiments, the altered drilling fluid consists of the drilling fluid and the LCM. In some embodiments, the LCM consists of the plurality of human hairs. In some embodiments, the LCM has a concentration in the range of 15 pounds-per-barrel (ppb) to 30 ppb in the altered drilling fluid. In some embodiments, each of the plurality of human hairs has a diameter in the range of 50 microns to 150 microns. In some embodiments, each of the plurality of human hairs has a medullary index in the range of greater than 0 and less than 0.33. In some embodiments, the method includes adding the LCM to the drilling fluid at a mud pit.

In another embodiments, an altered drilling fluid is provided that includes a drilling fluid and a lost circulation material (LCM), such that the LCM includes a plurality of human hairs. In some embodiments, the LCM consists of the plurality of human hairs. In some embodiments, the LCM has a concentration in the range of 15 pounds-per-barrel (ppb) to 30 ppb in the altered drilling fluid. In some embodiments, each of the plurality of human hairs has a diameter in the range of 50 microns to 150 microns. In some embodiments, each of the plurality of human hairs has a medullary index in the range of greater than 0 and less than 0.33. In some embodiments, the drilling fluid is a water-based drilling fluid.

In another embodiment, a method of forming a lost circulation material (LCM) is provided. The method includes collecting a plurality of human hairs from at least one waste source of human hairs, disinfecting a plurality of human hairs, and washing the plurality of human hairs after the disinfecting. The method also includes drying the plurality of human hairs after washing and sorting the plurality of human hairs into at least one group based on sizes of the plurality of human hairs to form the LCM. In some embodiments, the at least one group includes three groups, such that the three groups include a first group of the plurality of human hairs having respective lengths in the range of greater than zero and less than 10 millimeters (mm), a second group of the plurality of human hairs having respective lengths in the range of greater 10 mm and less than 20 mm, and a third group of the plurality of human hairs having respective lengths in the range of greater 20 mm and less than 30 mm.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore. It is this reduction or absence of returning drilling fluid that is referred to as lost circulation.

Embodiments of the disclosure include a human hair LCM that includes human hairs to mitigate or prevent lost circulation in a well, as well as provide seepage control and minimize or prevent fluid loss. The human hairs may be obtained from sources of human hair waste such as barber shops, salons, beauty parlors, and religious sites. The human hair LCM may include human hair having a diameter in the range of about 50 microns to about 150 microns. In some embodiments, the human hair LCM may include human hair having a diameter in the range of about 60 microns to about 80 microns. In some embodiments, the human hair LCM may include human hair having a length in the range of 2 millimeters (mm) to about 4 centimeters (cm). In some embodiments, the human hair LCM may include human hair having a length in the range of 8 mm to about 4 cm. In some embodiments, the human hair LCM may include human hair having a medullary index of greater than 0 but less than 0.33 As used in the disclosure, the term "medullary index" refers to the ratio of the maximum diameter of the medulla to the maximum diameter of the hair shaft.

The human hair LCM may form tightly packed plugs and seals in cracks and fractures in lost circulation zones to provide improved control of the loss of whole mud from the borehole to the surrounding formation, as compared to conventional and existing LCMs. The human hairs of the LCM may provide for the formation of tightly packed, low permeability and pressure tolerant plugs and seals within the fractures, gaps, fissures, cracks, faults and other openings of a formation to prevent the loss of whole mud during drilling or other operations.

Figure 1:
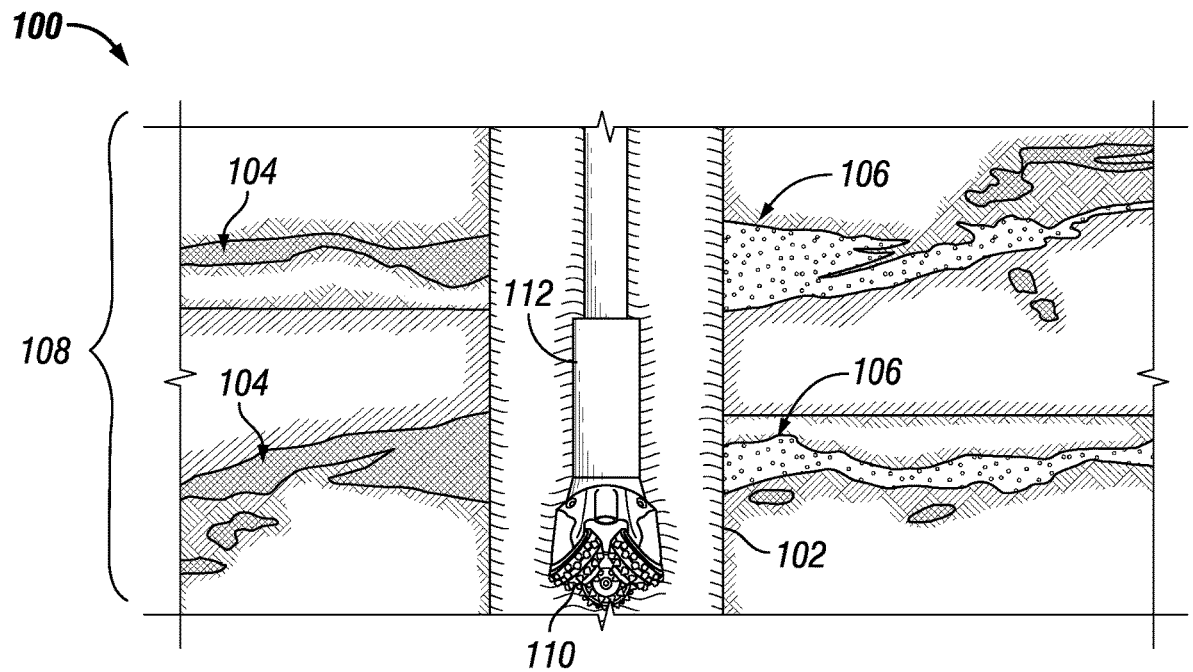
FIG. 1 is a schematic diagram of a wellbore intersecting fractures of a lost circulation zone in accordance with an embodiment of the disclosure.

FIG. 1 is a schematic diagram 100 of a wellbore 102 intersecting fractures 104 and 106 of a lost circulation zone 108 (also referred to as a "loss zone") in accordance with an embodiment of the disclosure. As will be appreciated, the wellbore 102 may be formed via a drill bit 110 coupled to a drill string 112 that passes through the lost circulation zone 108. By way of example, FIG. 1 depicts open fractures 104 through which a drilling fluid may be lost during drilling. In contrast, FIG. 1 also depicts blocked fractures 106 blocked by a human hair LCM in accordance with the techniques described in the disclosure.

The human hair LCM should be distinguished from animal hair that fails to provide the functionality and benefits described in the disclosure. Table 1 lists the physical and mechanical differences between human hair and animal hair:

TABLE 1

| DIFFERENCES BETWEEN HUMAN HAIR AND ANIMAL HAIR | | |
|---|---|---|
| Characteristic or Property | Human hair | Animal hair |
| Growth Pattern | Grows independently | Stops growing after reaching specific length (usually less than about 3 millimeters (mm)) |
| Physical Structure | Soft and long; able to coil, loop, spiral and twist to form seal or plug | Coarse and short; unable to coil, loop, spiral and twist |
| | Filament-like structure enables formation of seal or plug | Non-filament structure unable to form effective seal or plug |
| | Flattened and narrow cuticle scales | Spinous or coronal cuticle scales |

TABLE 1-continued

DIFFERENCES BETWEEN HUMAN HAIR AND ANIMAL HAIR

| Characteristic or Property | Human hair | Animal hair |
| --- | --- | --- |
| Medullary index | Less than about 0.33; indicative of greater mechanical stability and thus greater load-bearing capacity as compared to animal hair | In the range of about 0.5 to about 0.7 |

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a human hair LCM were prepared and evaluated against an animal hair LCM. In the experiments described supra, the animal hair LCM is formed from goat hair. Plugging efficiency tests were conducted on the human hair LCM and the goat hair LCM using a 2 millimeter (mm) slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 500 pounds-per-square inch (psi) differential pressure. For the plugging efficiency tests, the human hair LCM and the goat hair LCM were incorporated into a 65 pounds per cubic foot (pcf) bentonite mud. The composition of the 65 pcf bentonite mud with mud components expressed in pounds-per-barrels (lb/bbl) is shown in Table 2:

TABLE 2

COMPOSITION OF 65 PCF BENTONITE MUD

| Mud Component | lb/bbl |
| --- | --- |
| Water | 340.67 |
| Bentonite | 25.00 |
| Caustic Soda | 0.25 |
| Soda Ash | 0.25 |

The bentonite mud, human hair, and animal hair were tested using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a test sample of a homogenous mixture of 275 milliliters (ml) of the 65 pcf bentonite mud and an LCM into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;
21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;
22. Record the spurt loss, total leak off, and PPT values over the 30 minute time period and record the cake thickness after dismantling the test cell.

Table 3 shows the results of plugging efficiency tests for the 65 pcf bentonite mud without any LCM (that is, 0 parts-per-billion mass (ppb) LCM concentration), the example human LCM at 15 ppb and 30 ppb concentrations in the 65 pcf bentonite mud, and the goat hair LCM at 15 ppb and 30 ppb concentrations in the 65 pcf bentonite mud, with the spurt loss, fluid loss, total leak off, and PPT value measured in cubic centimeters (cc) and the cake thickness measured in mm:

TABLE 3

PLUGGING EFFICIENCY TEST RESULTS FOR
HUMAN HAIR MIX LCM AND GOAT HAIR LCM

| LCM | Concen-tration | Spurt Loss (cc) | Fluid Loss (cc) | Total Leak Off (cc) | Cake Thickness (mm) | PPT Value (cc) |
|---|---|---|---|---|---|---|
| None | 0 ppb | All mud lost within a few seconds | | | | |
| Human hair LCM | 15 ppb | All mud lost within 8 minutes | | | | |
| Human hair LCM | 30 ppb | All mud lost within 14 minutes | | | | |
| Goat hair LCM | 15 ppb | All mud lost within 3 to 4 minutes | | | | |
| Goat hair LCM | 30 ppb | All mud lost within 4 to 6 minutes | | | | |

As shown by Table 3, the bentonite mud without any LCM was lost from the PPT test cell within a few seconds after application of the 500 psi differential pressure. At a 15 ppb concentration of human hair LCM, the bentonite mud was lost from the PPT cell at a slower rate than without any human hair LCM, and at a significantly slower rate at a concentration of 20 ppb of human hair LCM. The human hair LCM thus demonstrated a significant decrease in the rate of loss of the bentonite mud as compared to mud without the LCM.

The human hair LCM also exhibited superior mud loss performance as compared to animal hair LCM. As shown in Table 3, at both 15 ppb and 30 ppb concentrations, the human hair LCM exhibited significantly slower rates of mud loss (that is, about half the rate of mud loss) than the goat hair LCM at the same concentrations.

Human Hair LCM Manufacture and Use

In some embodiments, a human hair LCM may include human hairs. In some embodiments, a human hair LCM may consist of human hairs without any other components. The human hairs include human hair obtained from sources of human hair waste such as barber shops, saloons, beauty parlors, and religious sites. The human hair may be obtained from municipal waste streams (for example, from bathtubs, showers, basins), drainage systems, and sewer lines.

As will be appreciated, local sources of human hair may reduce the cost of imported LCM products, components, or both. In some embodiments, the human hair may be prepared by cleaning the human hair before use or processing, such as by washing and disinfecting the human hair.

In some embodiments, the human hair LCM may include human hair having a diameter in the range of about 50 microns to about 150 microns. In some embodiments, the human hair LCM may include human hair having a diameter in the range of about 60 microns to about 80 microns. In some embodiments, the human hair LCM may include human hair having a length in the range of 2 millimeters (mm) to about 4 centimeters (cm). In some embodiments, the human hair LCM may include human hair having a length in the range of 8 mm to about 4 cm. In some embodiments, the human hair LCM may include human hair having a length of greater than zero and less than 10 mm and may be referred to as "fine grade." In some embodiments, the human hair LCM may include human hair having a length in the range of about 10 mm to about 20 mm and may be referred to as "medium grade." In some embodiments, the human hair LCM may include human hair having a length in the range of greater than 20 mm to about 30 mm and may be referred to as "large grade." In some embodiments, the human hair LCM may include human hair having a medullary index of greater than 0 but less than 0.33.

In some embodiments, the human hair LCM may be added directly to a drilling fluid, such as a drilling mud, to create an altered drilling fluid having the human hair LCM. For example, in some embodiments, the human hair LCM may be added to (for example, blended with) an oil-based drilling mud or a water-based drilling mud. In some embodiments, the human hair LCM may be added at the mud pit of a mud system. In some embodiments, the human hair LCM may be added in an amount in the range of about 15 ppb to about 30 ppb. In some embodiments, the human hair LCM may be added in amounts greater than 30 ppb, such as in the range of 30 ppb to 40 ppb, or in the range of 40 ppb to 50 ppb.

After addition of the human hair LCM to a drilling fluid, the altered drilling fluid may be circulated at a pump rate effective to position the altered drilling fluid into contact with a lost circulation zone in a wellbore, such that the human hair LCM alters the lost circulation zone (for example, by entering and blocking porous and permeable paths, cracks, and fractures in a formation in the lost circulation zone, such as forming a structure in a mouth or within a fracture).

As noted in the disclosure, the human hair LCM may prevent degradation of the LCM while circulating downhole in the drilling fluid. Moreover, the non-toxic and environmentally friendly properties of the human hairs in the human hair LCM may minimize or prevent any environmental impact and effect on ecosystems, habitats, population, crops, and plants at or surrounding the drilling site where the human hair LCM is used.

Figure 2:
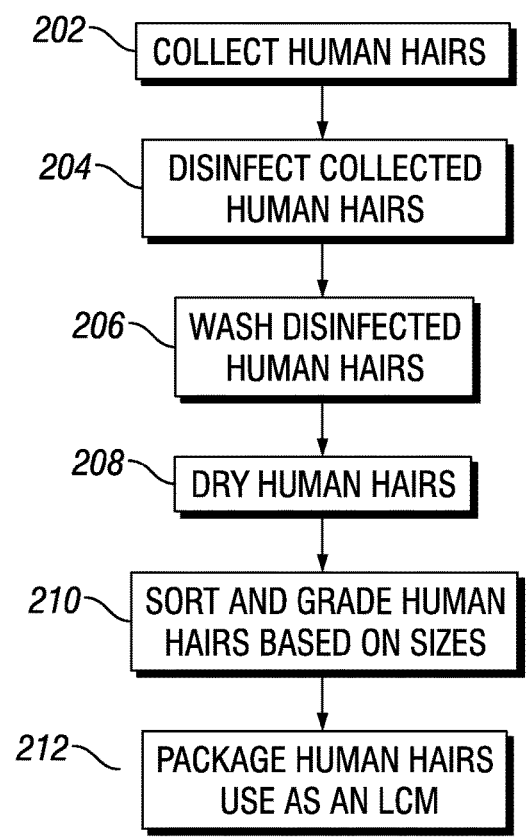
FIG. 2 is a block diagram of a process for the production and use of a human hair LCM in accordance with an embodiment of the disclosure.

FIG. 2 depicts a process 200 for the production and use of a human hair LCM in accordance with an example embodiment of the disclosure. As shown in FIG. 2, human hair may be collected (block 202), such as from sources of human hair waste such as barber shops, saloons, beauty parlors, and religious sites. In some embodiments, the human hair may be disinfected (block 204), such as using alcohol, ammonia, or other sterilization techniques that do not destroy the human hair. The human hair may then be washed (block 206), such as by a high pressure water or air jet, to remove disinfectant, dirt, dust, and other foreign substances. The washed human hair may be dried (block 208), such as by sun-drying over a time period at atmospheric conditions or using an oven.

In some embodiments, the dried human hair may be sorted and graded into different sizes of human hair LCM (block 210). For example, in some embodiments, the human hair may be sorted and graded into the following sizes: a length of greater than zero and less than 10 mm ("fine grade"), a length in the range of about 10 mm to about 20 mm ("medium grade"), and a length in the range of greater than 20 mm to about 30 mm ("large grade").

In some embodiments, the human hair may be packed for transportation and use (block 212). For example, the human hair may be packed in water-proof bags. In some embodiments, a suitable amount of packed human hair may then be transported to an oil and gas operations site for use as a human hair LCM.

In some embodiments, the human hair LCM may be added directly to a drilling fluid, such as a drilling mud, to create an altered drilling fluid having the human hair LCM. For example, in some embodiments, the human hair LCM may be added to (for example, blended with) an oil-based drilling mud or a water-based drilling mud. In some embodiments, the human hair LCM may be added at the mud pit of a mud system. After addition of the human hair LCM to a drilling fluid, the altered drilling fluid may be circulated at a pump rate effective to position the drilling fluid into contact with a lost circulation zone in a wellbore, such that the human hair LCM alters the lost circulation zone (for example, by entering and blocking porous and permeable paths, cracks, and fractures in a formation in the lost circulation zone). The human hair LCM may entangle, interweave, network, curl, and otherwise interact under pressure to form a plug or seal at openings of fractures, gaps, fissures, and cracks, in a lost circulation zone. In some embodiments, the reduced rate of lost circulation may be negligible. In some embodiments, the human hair LCM may be introduced via an open ended drill pipe to place the LCM in the lost circulation zone. As compared to available LCMs, the plugs and seals formed from human hair may be resistant or impervious to mechanical, thermal, chemical, and biological degradation at both surface and downhole conditions.

In other embodiments, the human hair LCM and one or more additional LCMs may be added to a drilling fluid, such as a drilling mud, to create an altered drilling fluid having the LCMs. For example, in some embodiments, the human hair LCM and one or more additional LCMs may be added to an oil-based drilling mud or a water-based drilling mud.

In some embodiments, the human hair LCM may be mixed with a carrier fluid, a viscosifier, or both. In some embodiments, a human hair LCM homogenous suspension or pill may be formed. For example, a specific carrier fluid, viscosifier, or combination thereof may be selected to form a homogenous suspension or pill having the human hair LCM. The homogenous suspension or pill may be added to a drilling fluid and used in the manner similar to the human hair LCM described in the disclosure.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. An altered drilling fluid, comprising:
   a drilling fluid; and
   a lost circulation material (LCM), wherein the LCM comprises consists of a plurality of human hairs.

2. The altered drilling fluid of claim 1, wherein the LCM comprises a concentration in the range of 15 pounds-per-barrel (ppb) to 30 ppb in the altered drilling fluid.

3. The altered drilling fluid of claim 1, wherein each of the plurality of human hairs has a diameter in the range of 50 microns to 150 microns.

4. The altered drilling fluid of claim 1, wherein each of the plurality of human hairs has a medullary index in the range of greater than 0 and less than 0.33.

5. The altered drilling fluid of claim 1, wherein the drilling fluid comprises a water-based drilling fluid.

6. A method of forming a lost circulation material (LCM), comprising:
   collecting a plurality of human hairs from at least one waste source of human hairs;
   disinfecting a plurality of human hairs;
   washing the plurality of human hairs after the disinfecting;
   drying the plurality of human hairs after washing;
   sorting the plurality of human hairs into at least one group based on sizes of the plurality of human hairs to form the LCM.

7. The method of claim 6, wherein the at least one group comprises three groups, the three groups comprising:
   a first group of the plurality of human hairs having respective lengths in the range of greater than zero and less than 10 millimeters (mm);
   a second group of the plurality of human hairs having respective lengths in the range of greater 10 mm and less than 20 mm;
   a third group of the plurality of human hairs having respective lengths in the range of greater 20 mm and less than 30 mm.

* * * * *

UNITED STATES PATENT AND TRADEMARK OFFICE
CERTIFICATE OF CORRECTION

PATENT NO. : 11,279,862 B2
APPLICATION NO. : 17/109738
DATED : March 22, 2022
INVENTOR(S) : Amanullah et al.

Page 1 of 1

It is certified that error appears in the above-identified patent and that said Letters Patent is hereby corrected as shown below:

In the Claims

In Column 10, Claim 1, Line 18 should read:
-- consists of a plurality of human hairs. --

Signed and Sealed this
Twenty-sixth Day of April, 2022

Katherine Kelly Vidal
*Director of the United States Patent and Trademark Office*